(12) United States Patent
Andrews et al.

(10) Patent No.: US 6,461,487 B1
(45) Date of Patent: Oct. 8, 2002

(54) GENERATION AND DELIVERY DEVICE FOR OZONE GAS

(75) Inventors: Craig C. Andrews, College Station, TX (US); Oliver J. Murphy, Bryan, TX (US)

(73) Assignee: Lynntech International Ltd., College Station, TX (US)

(*) Notice: Subject to any disclaimer, the term of this patent is extended or adjusted under 35 U.S.C. 154(b) by 0 days.

(21) Appl. No.: 09/431,424

(22) Filed: Nov. 1, 1999

Related U.S. Application Data

(63) Continuation of application No. 09/002,754, filed on Jan. 5, 1998.

(51) Int. Cl.$^7$ ................................................. C25B 9/00
(52) U.S. Cl. ................................. 204/262; 204/263
(58) Field of Search .................... 204/252, 263, 204/271, 415, 430, 256

(56) References Cited

U.S. PATENT DOCUMENTS

| | | | |
|---|---|---|---|
| 2,925,371 A | 2/1960 | Van Winckel et al. | 204/222 |
| 3,742,301 A | 6/1973 | Burris | 361/230 |
| 3,823,728 A | 7/1974 | Burris | 137/101.19 |
| 4,019,986 A | 4/1977 | Burris | 210/139 |
| 4,214,969 A | 7/1980 | Lawrance | 204/255 |
| 4,316,782 A | 2/1982 | Foller et al. | 205/626 |
| 4,375,395 A | 3/1983 | Foller et al. | 204/294 |
| 4,416,747 A | 11/1983 | Menth et al. | 205/338 |
| 4,417,969 A | 11/1983 | Ezzell et al. | 205/252 |
| 4,541,989 A | 9/1985 | Foller | 204/176 |
| 4,555,335 A | 11/1985 | Burris et al. | 210/192 |
| 4,759,849 A | 7/1988 | Baumann et al. | 210/195.2 |
| 4,792,407 A | 12/1988 | Zeff et al. | 210/748 |
| 4,876,115 A | 10/1989 | Raistrick | 427/115 |
| 4,927,800 A | 5/1990 | Nishiki et al. | 204/282 |
| 4,992,126 A | 2/1991 | Door | 156/182 |
| 5,097,556 A | 3/1992 | Engel et al. | 68/13 R |
| 5,114,549 A | 5/1992 | Shimanune et al. | 204/263 |
| 5,242,764 A | 9/1993 | Dhar | 29/623.4 |
| 5,246,792 A | 9/1993 | Watanabe | 429/33 |
| 5,290,406 A | 3/1994 | Sawamoto et al. | 205/626 |
| 5,372,689 A | 12/1994 | Carlson et al. | 204/252 |
| 5,385,711 A | 1/1995 | Baker et al. | 204/176 |
| 5,460,705 A | * 10/1995 | Murphy et al. | 204/252 |
| 5,529,683 A | 6/1996 | Critz et al. | 205/342 |
| 5,578,388 A | 11/1996 | Faita et al. | 429/26 |
| 5,589,052 A | * 12/1996 | Shimamune et al. | 205/349 |
| 5,607,562 A | 3/1997 | Shimamune et al. | 204/265 |
| 5,635,039 A | * 6/1997 | Cisar et al. | 204/252 |
| 5,766,488 A | 6/1998 | Uban et al. | 210/192 |
| 5,779,865 A | 7/1998 | Schulze | |
| 5,989,407 A | * 11/1999 | Andrews et al. | 205/626 |
| 5,997,702 A | 12/1999 | Koganezawa | |

FOREIGN PATENT DOCUMENTS

| | | |
|---|---|---|
| DE | 0822271 A2 | 7/1997 |
| FR | 864256 | * 11/1939 |
| WO | WO94/07802 | 4/1994 |
| WO | WO 01/35755 A1 | 5/2001 |

OTHER PUBLICATIONS

Perry and Chilton Chemical Engineer's Handbook ISBN–0–07–049478–9 5$^{th}$ Ed., no month available, 1973.*

(List continued on next page.)

Primary Examiner—Donald R. Valentine
Assistant Examiner—Thomas H Parsons
(74) Attorney, Agent, or Firm—Streets & Steele; Jeffrey L. Streets

(57) ABSTRACT

The present invention provides an ozone generation and delivery system that lends itself to small scale applications and requires very low maintenance. The system preferably includes an anode reservoir and a cathode phase separator each having a hydrophobic membrane to allow phase separation of produced gases from water. The hydrogen gas, ozone gas and water containing ozone may be delivered under pressure.

17 Claims, 10 Drawing Sheets

OTHER PUBLICATIONS

Pallav Tatapudi and James M. Fenton, "Simultaneous Synthesis of Ozone and Hydrogen Peroxide in a Proton-Exchange-Membrane Electrochemical Reactor," May 1994, pp. 1174–1178.

Pallav Tatapudi and James M. Fenton, "Synthesis of Hydrogen Peroxide in a Proton Exchange Membrane Electrochemical Reactor," Apr. 1993, pp. L55–L57.

Pallav Tatapudi and James M. Fenton, "Paired Synthesis of Ozone and Hydrogen Peroxide In An Electrochemical Reactor," pp. 275–283 (NO DATE SUPPLIED).

Pallav Tatapudi and James F. Fenton, "Synthesis of Ozone in a Proton Exchange Membrane Electrochemical Reactor," Dec. 1993, p. 35273530.

Chemical Engineers Handbook, Perry and Chilton, Fifth edition, 1973, McGraw-Hill, Inc. (no month available).

Masahiro Watanabe, Yasutaka Satah, and Chiyoka Shimura, "Management of the Water Content in Polymer Electrolyte Membranes with Porous Fiber Wicks," Nov. 1993, pp. 3190–3193.

Tom D. Rogers, G. Duncan Hitchens, Carlos E. Salinas, and Oliver J. Murphy, "Water Purification, Microbiological Control, Sterilization and Waste Decomposition Using an Electrochemical Advanced Ozonation Process, " Jul. 13–16, 1996, 10 pages.

G. Duncan Hitchens and Oliver J. Murphy, "Development of Proton-Exchange Membrane Electrochemical Reclaimed Water Post-Treatment System," Jul. 15–18, 1991, pates 131–140.

* cited by examiner

GENERATION AND DELIVERY DEVICE FOR OZONE GAS

"This is a continuation of copending application (s) Ser. No. 09/002,754 filed on Jan. 5, 1998 pending."

BACKGROUND OF THE INVENTION

1. Field of the Invention

This invention relates to the production and delivery of ozone in highly concentrated forms, both in high weight percent gas and high levels of ozone dissolved in water. More specifically, the invention relates to an electrochemical system capable of efficiently generating even small amounts of ozone.

This invention was made with Government support under contract NAS9 97023 awarded by NASA. The Government has certain rights in this invention.

2. Description of the Related Art

Ozone has long been recognized as a useful chemical commodity valued particularly for its outstanding oxidative activity. Because of this activity, it finds wide application in disinfection processes. In fact, it kills bacteria more rapidly than chlorine, it decomposes organic molecules, and removes coloration in aqueous systems. Ozonation removes cyanides, phenols, iron, manganese, and detergents. It controls slime formation in aqueous systems, yet maintains a high oxygen content in the system. Unlike chlorination, which may leave undesirable chlorinated organic residues in organic containing systems, ozonation leaves fewer potentially harmful residues. Ozone has also been shown to be useful in both gas and aqueous phase oxidation reactions which may be carried out by advanced oxidation processes (AOPs) in which the formation of OH• radicals is enhanced by exposure to ultraviolet light. Certain AOPs may even involve a catalyst surface, such as a porous titanium dioxide photocatalyst, that further enhances the oxidation reaction. There is even evidence that ozone will destroy viruses. Consequently, it is used for sterilization in the brewing industry and for odor control in sewage treatment and manufacturing. Ozone may also be employed as a raw material in the manufacture of certain organic compounds, e.g., oleic acid and peroxyacetic acid.

Thus, ozone has widespread application in many diverse activities, and its use would undoubtedly expand if its cost of production could be reduced. For many reasons, ozone is generally manufactured on the site where it is used. However, the cost of generating equipment, and poor energy efficiency of production has deterred its use in many applications and in many locations.

On a commercial basis, ozone is currently produced by the silent electric discharge process, otherwise known as corona discharge, wherein air or oxygen is passed through an intense, high frequency alternating current electric field. The corona discharge process forms ozone through the following reaction:

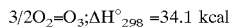

Yields in the corona discharge process generally are in the vicinity of 2% ozone, i.e., the exit gas may be about 2% $O_3$ by weight. Such $O_3$ concentrations, while quite poor in an absolute sense, are still sufficiently high to furnish usable quantities of $O_3$ for the indicated commercial purposes. Another disadvantage of the corona process is the production of harmful $NO_x$ otherwise known as nitrogen oxides. Other than the aforementioned electric discharge process, there is no other commercially exploited process for producing large quantities of $O_3$.

However, $O_3$ may also be produced through an electrolytic process by impressing an electric current (normally D.C.) across electrodes immersed in an electrolyte, i.e., electrically conducting fluid. The electrolyte includes water, which, in the process dissociates into its respective elemental species, $O_2$ and $H_2$. Under the proper conditions, the oxygen is also evolved as the $O_3$ species. The evolution of $O_3$ may be represented as:

It will be noted that the $\Delta H°$ in the electrolytic process is many times greater than that for the electric discharge process. Thus, the electrolytic process appears to be at about a six-fold disadvantage.

More specifically, to compete on an energy cost basis with the electric discharge method, an electrolytic process must yield at least a six-fold increase in ozone. Heretofore, the necessary high yields have not been realized in any foreseeable practical electrolytic system.

The evolution of $O_3$ by electrolysis of various electrolytes has been known for well over 100 years. High yields up to 35% current efficiency have been noted in the literature. Current efficiency is a measure of ozone production relative to oxygen production for given inputs of electrical current, i.e., 35% current efficiency means that under the conditions stated, the $O_2/O_3$ gases evolved at the anode are comprised of 35% $O_3$ by weight. However, such yields could only be achieved utilizing very low electrolyte temperatures, e.g., in the range from about –30° C. to about –65° C. Maintaining the necessary low temperatures, obviously requires costly refrigeration equipment as well as the attendant additional energy cost of operation.

Ozone, $O_3$, is present in large quantities in the upper atmosphere in the earth to protect the earth from the suns harmful ultraviolet rays. In addition, ozone has been used in various chemical processes and is known to be a strong oxidant, having an oxidation potential of 2.07 volts. This potential makes it the fourth strongest oxidizing chemical known.

Because ozone has such a strong oxidation potential, it has a very short half-life. For example, ozone which has been solubilized in waste water may decompose in a matter of 20 minutes. Ozone can decompose into secondary oxidants such as highly reactive hydroxyl (OH•) and peroxyl ($HO_2$•) radicals. These radicals are among the most reactive oxidizing species known. They undergo fast, non-selective, free radical reactions with dissolved compounds. Hydroxyl radicals have an oxidation potential of 2.8 volts (V), which is higher than most chemical oxidizing species including $O_3$. Most of the OH• radicals are produced in chain reactions where OH• itself or $HO_2$• act as initiators.

Hydroxyl radicals act on organic contaminants either by hydrogen abstraction or by hydrogen addition to a double bond, the resulting radicals disproportionate or combine with each other forming many types of intermediates which react further to produce peroxides, aldehydes and hydrogen peroxide.

Electrochemical cells in which a chemical reaction is forced by added electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

Recent ozone research has been focused primarily on methods of using ozone, as discussed above, or methods of increasing the efficiency of ozone generation. For example, research in the electrochemical production of ozone has resulted in improved catalysts, membrane and electrode assemblies, flowfields and bipolar plates and the like. These efforts have been instrumental in making the electrochemical production of ozone a reliable and economical technology that is ready to be taken out of the laboratory and placed into commercial applications.

However, because ozone has a very short life in the gaseous form, and an even shorter life when dissolved in water, it is preferably generated in close proximity to where the ozone will be consumed. Traditionally, ozone is generated at a rate that is substantially equal to the rate of consumption since conventional generation systems do not lend themselves to ozone storage. Ozone may be stored as a compressed gas, but when generated using corona systems the pressure of the output gas stream is essentially at atmospheric pressure. Therefore, additional hardware for compression of the gas is required, which in itself reduces the ozone concentration through thermal and mechanical degradation. Ozone produced by the corona process may also be dissolved in liquids such as water but this process generally requires additional equipment for introducing the ozone gas into the liquid, and at atmospheric pressure and ambient temperature only a small amount of ozone may be dissolved in water.

Because so many of the present applications have the need for relatively small amounts of ozone, it is generally not cost effective to use conventional ozone generation systems such as corona discharge. Furthermore, since many applications require either ozone gas to be delivered under pressure or ozone dissolved in water as for disinfection, sterilization, treatment of contaminants, etc., the additional support equipment required to compress and/or dissolve the ozone into the water stream further increases system costs. Also, in some applications, it is necessary to maximize the amount of dissolved ozone in pure water by engaging ozone gas in chilled water under pressure. This mode of operation can minimize the amount of pure water required to dissolve a large amount of ozone. Such highly concentrated aqueous solutions of ozone can be added to a stream of process water to maintain a desired concentration of ozone in the process water stream.

Therefore, there is a need for an ozone generator system that operates efficiently on standard AC or DC electricity and water to deliver a reliable stream of ozone gas that is generated under pressure for direct use in a given application. Still other applications would benefit from a stream of highly concentrated ozone that is already dissolved in water where it may be used directly or diluted into a process stream so that a target ozone concentration may be achieved.

It would be desirable if the ozone generator system was self-contained, self-controlled and required very little maintenance. It would be further desirable if the system had a minimum number of moving or wearing components and could be operated with a minimal control system.

SUMMARY OF THE INVENTION

The present invention provides an ozone generation and delivery system comprising an electrochemical cell having an anode and a cathode, a cathode reservoir in communication with the cathode, and a cooling member disposed in thermal communication with the cathode reservoir. The cathode may form a portion of the cathode reservoir. Where the cathode reservoir is a cathode phase separator chamber, it may include a gas outlet port disposed in a top portion of the cathode phase separator chamber, with the cathode disposed in a bottom portion of the cathode phase separator chamber. Furthermore, the cathode phase separator chamber should provide fluid communication with the cathode allowing the free exchange of water and gas bubbles between the cathode and the cathode phase separator chamber. The ozone generation and delivery system may further comprise an anode reservoir in fluid communication with the anode, a water source in fluid communication with the cathode reservoir, a water source in fluid communication through a backflow prevention device to the anode reservoir, and/or a pressure control device in the gas outlet port. Optionally, the anode reservoir may comprise a liquid reservoir, a gas outlet port located at the top of the reservoir and a porous hydrophobic membrane disposed over the gas outlet port, wherein the porous hydrophobic membrane of the anode reservoir allows gas to be separated from water while the water is contained under pressure. The system may also comprise a recycle line providing fluid communication from the cathode phase separator to the anode reservoir, perhaps with a backflow prevention device in the recycle line. Preferably, the recycle line has a sufficiently small diameter to prevent dissolved ozone from diffusing from the anode reservoir to the cathode phase separator. It is also preferable that the cathode and anode are separated by a proton exchange membrane. The system may comprise a pressure regulating member disposed in the gas outlet. Additionally, the anode reservoir may further comprises a water outlet near the base of the anode reservoir.

The present invention also provides an ozone generation and delivery system comprising a plurality of electrochemical cells, each cell having an anode and a cathode, and further comprising an anode reservoir in communication with the anodes, the anode reservoir preferably comprising a gas outlet port and a porous hydrophobic membrane disposed over the gas outlet port. The plurality of electrochemical cells are preferably placed in a filter press arrangement, but may also be placed with the anodes forming a portion of the anode reservoir.

Additionally, the present invention provides an electrochemical method of generating and delivering ozone, comprising the steps of (a) electrolyzing water in one or more electrolytic cells to generate ozone in water at the anode and a cathodic product in water at the cathode; (b) circulating water between the cathode and the cathode reservoir; and (c) cooling water in the cathode reservoir. The hydrogen gas may be separated from the cathode water using a porous hydrophobic membrane disposed in the cathode phase separator. The method may further comprise back diffusing water from the cathode through a proton exchange membrane to the anode, wherein the proton exchange membrane is disposed between the cathode and anode. Further, the method may comprise delivering ozone gas from the anode under pressure and/or delivering the anode water from the anode reservoir under pressure. The method may also include destroying surplus ozone and hydrogen.

Another aspect of the present invention provides an electrochemical cell, comprising a compressible electrode, a rigid electrode, and a proton exchange membrane compressed between the compressible electrode and the rigid electrode. Preferably, the compressible electrode and rigid electrodes contain a fluid, wherein the fluid in the compressible electrode is under greater pressure than the fluid in the rigid electrode. The electrochemical cell may further comprise a rigid support member behind the compressible electrode reducing the compression on the compressible electrode.

Finally, the present invention provides a method of operating an electrochemical cell, comprising: (a) providing a reactant to an electrode at a flowrate substantially equal to consumption of the reactant, and (b) periodically flushing the electrode with the reactant at a flowrate substantially greater that consumption of the reactant to remove compounds accumulated on the electrode. Optionally, the method may further comprise (c) monitoring the flowrate of reactant into the electrode.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
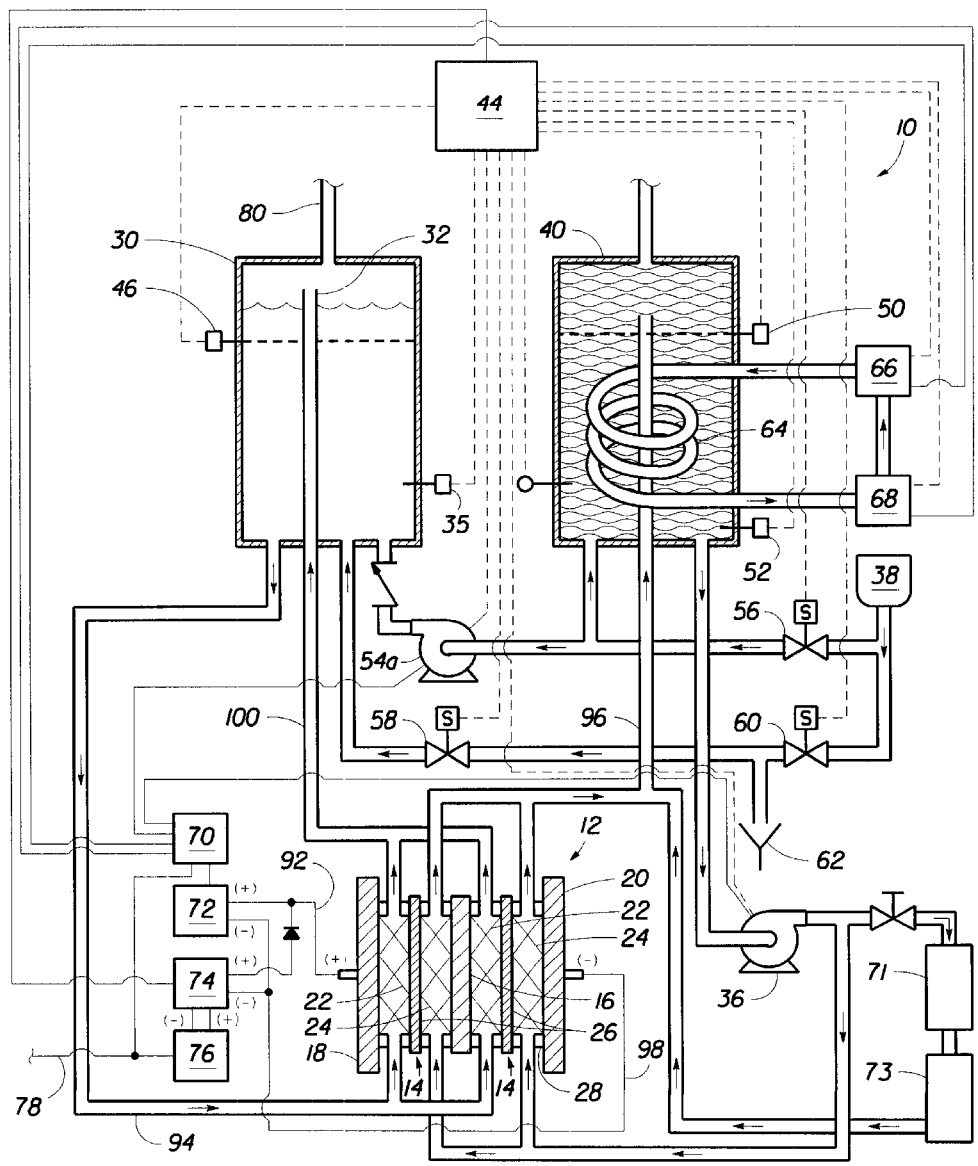
FIG. 1 is a schematic diagram of a self-controlled ozone generator and delivery system having its cooling member disposed in the cathode reservoir.

The present invention provides an ozone generation and delivery system that lends itself to small scale applications. While the present ozone generators may also be made quite large, the generators may be made quite small and compact for point-of-use production of ozone. The ozone generators are simple to operate and require very low maintenance.

In one aspect of the invention, anode and/or cathode reservoirs are provided with means for separating gas and liquid phases, including a hydrophobic membrane or mechanical valves to allow phase separation of the gases produced at the electrode from water and for water level maintenance. The preferred phase separator is a hydrophobic membrane which eliminates the need for a complicated system of valves and level indicators, thereby eliminating the need for ozone compatible seals and materials, reducing potential breakdowns, and reducing maintenance. Another benefit of using hydrophobic membranes in the anode reservoir is that the reservoir may be completely full of water, thereby making the most efficient use of the size of the reservoir. The hydrophobic membranes used in the present invention include any membrane that is chemically resistant, i.e., anode phase separator resistant to ozone, gas permeable and water resistant. Examples of useful hydrophobic membranes include porous polytetrafluoroethylene (PTFE) and porous metals or ceramics impregnated with fluorinated polymers.

In another aspect of the invention, a cathode phase separator is provided with a phase separating means, such as mechanical valves for water level maintenance or a porous, hydrophobic membrane to allow phase separation of hydrogen gas produced at the cathode from water electroosmotically transported to the cathode. The preferred phase separating means is a hydrophobic membrane disposed in the cathode reservoir above the hydrogen-containing water coming from the cathode. The cathode phase separator may be located independent of the electrolytic cell(s) or anode reservoir, thereby providing flexibility in the configuration and dimensions of the overall system. When using a porous, hydrophobic membrane, the cathode may be directly connected to a water source, in which case the maximum pressure of the system output (ozone/oxygen gas or hydrogen gas) is limited by the delivery pressure of the water. Therefore, it may be desirable to include a water pressure boosting device, such as a pump, prior to water pretreatment and introduction. Again, it is not necessary for this pump to be chemical resistant, only that it is compatible with deionized water.

Another aspect of the invention provides for hydrogen gas, ozone gas and/or water containing ozone to be delivered under pressure without the use of pumps. In an entirely passive system, a water source communicates with the anode reservoir and cathode reservoir so that hydrogen gas, ozone gas and water containing ozone may be delivered at the same pressure as the water source. The passive system has no moving parts and requires extremely low maintenance. If higher pressures are desired, a self-pressurizing system may be used in which the low pressure water source is protected by a backflow prevention device and the ozone gas outlet from the anode reservoir includes a pressure control device. The output pressures of the ozone gas and hydrogen gas are independent of each other up to a common maximum pressure.

Yet another aspect of the invention provides an anode reservoir, such as a standing column of water, that effectively scrubs ozone from the anode gas. The water in the anode reservoir may be chilled or held under pressure to increase the amount of ozone driven into solution and, preferably, minimize mixing of the anode water. First, the present systems of dissolving, storing and delivering water containing high concentrations of ozone may be fitted with internal horizontal baffling to minimize mixing of water in the anode as fresh water supplied to the anode reservoir displaces the saturated water. The internal baffles prevent gas lift mixing, i.e., bottom to top stirring of the water in the anode reservoir due to the rising ozone/oxygen bubbles. A small hole may be provided in the baffle to allow gas bubbles to pass therethrough. Second, the fresh water may be heated, such as with a heat exchanger, prior to being introduced into the anode reservoir in order to raise the incoming fresh water temperature to ambient, or slight greater than ambient, temperature. The warmer make-up water source is preferably introduced into the top of the anode reservoir, thereby establishing a temperature gradient (high temperature at the top and low temperature at the bottom) and an ozone saturation gradient (high concentration ozone at the bottom and fresh water at the top). The coldest water located at the bottom of the reservoir adjacent the anode will maintain the highest concentrations of ozone and is provided with the first opportunity to capture ozone from the bubble stream. The water added to the top of the anode reservoir is only allowed to capture ozone that cannot be utilized by the water there below which will be the first water to be delivered to an ozone consuming process. Therefore, the thermal separation of the water provides a natural barrier to mixing. Finally, layers of hydrophobic membranes may be disposed in the anode reservoir to allow direct gas transfer up the column of water while preventing mixing of the water. The flow of water among the isolated regions, or "mini-reservoirs", between the hydrophobic membranes may be provided by external plumbing of sufficiently small diameter to prevent back diffusion of ozone.

A further aspect of the invention provides a water polishing system, preferably in a cathode reservoir circulation loop, consisting of a catalyst bed, such as activated carbon, to destroy any ozone in the cathode water resulting from membrane or seal leakage, electro-osmosis, etc., and a deionizing column plumbed in series therewith. All or part of the cathode recirculation water may be circulated through this polishing system to continuously purify and deionize the water. In addition to polishing recirculated water, the same or different polishing system may treat make up water before it enters the cathode loop.

Another aspect of the invention dramatically reduces the quantity of water in the anode system by reducing the size of or completely eliminating the anode reservoir and providing only a minimal amount of water to the anode. The water level in the anode may be maintained by designing the system so that excess water from the anode is carried out of the anode by the flow of ozone gas. However, water must still be provided to the anode even if the anode reservoir is eliminated. Water may be supplied using either a mechanical control and feedback system or a predetermined and fixed water transfer rate, such as using an orifice, that is based on electrolyzer current, time and other relevant variables. Further, a fixed water transfer rate may be designed to provide a slight excess of water which will be swept away with the ozone gas.

Yet another aspect of the invention provides indirect delivery of water to the anode for electrolysis and/or indirect delivery of water to the membrane for hydration. Indirect delivery of water may be provided by back diffusion of water from the cathode using a suitable membrane or by using a tubulated membrane assembly with the tubes in communication with a water source.

Still another aspect of the invention provides for operating the cathode in a depolarized mode, for example by combining hydrogen atoms with oxygen, perhaps supplied from the air, to form water vapor rather than hydrogen gas. Oxygen and other cathodic depolarizers may be used to improve the operating efficiency of the electrolyzer.

The present invention provides an ozone generator that is useful for the on-site generation and delivery of ozone that can be provided at a rate that accommodates a constant or variable demand for ozone. The ozone generator may be operated in a batch mode where the short term demand for ozone is significantly higher than the maximum ozone production rate of the electrochemical cell, but the demand is periodic. In such cases, where the average daily demand is comparable to the average daily production, the system may dissolve sufficient amounts of ozone in the water so that when ozone is required for the related process it may be provided in a highly concentrated form and diluted down as it is injected into the process stream. Likewise, ozone gas may be pressurized and stored in a gas accumulator for load leveling of gas. The ozone generators of the present invention may provide the process with a water stream containing a high concentration of dissolved ozone, a high weight percent ozone gas stream, or ozone in both forms.

The ozone generator includes one or more electrolytic cells comprising an anode, a cathode, and a proton exchange membrane (PEM) disposed between the anode and cathode. The PEM is not only proton conducting, but also electronically insulating and gas impermeable to maintain separation of ozone and oxygen gases generated at the anode from hydrogen or other gases generated at the cathode. The preferred PEM is a perfluorinated sulfonic acid polymer, available as NAFION from Du Pont de Nemours, Wilmington, Del.

The ozone generator may comprise an anode reservoir in fluid communication with the anode and having a means of separating the ozone and oxygen gases from liquid water. The anode reservoir is preferably positioned to provide the free flow of water from the anode reservoir to the anode and the free flow of water, oxygen gas, and ozone gas from the anode to the anode reservoir.

The anode reservoir will preferably further comprise a porous hydrophobic membrane placed in such a manner that it provides phase separation between the oxygen/ozone gas bubbles generated at the anode and the water in the anode reservoir. The use of this hydrophobic membrane allows the anode reservoir to be in direct communication with a water source to provide a continuously filling anode reservoir and the delivery of ozone gas, oxygen gas, and ozone dissolved in the anode water at the same pressure as the feed water. The water source is preferably in communication with the anode reservoir through small diameter tubing to reduce or eliminate the amount of ozone lost through diffusion out of the system. The preferred porous hydrophobic membranes are made from polytetrafluoroethylene (PTFE), such as GORETEX available from W. L. Gore & Associates, Elkton, Md.

The ozone generation system further comprises a cathode preferably in direct communication with its own phase separation system to allow the hydrogen generated at the cathode to be discharged for use in a secondary process, for venting, or for destruction. The cathode phase separating system may also be placed in fluid communication with the anode reservoir, thereby allowing the water that is transferred from the anode to the cathode through electroosmosis to eventually be returned to the anode. This phase separating system utilizes a porous hydrophobic membrane to allow the free release of hydrogen gas to any pressure below the cathode pressure while retaining the water in the system at pressures equal to or higher than the hydrogen discharge pressure.

The electrolytic cells preferably generate gas comprising between about 10% and about 18% by weight ozone in oxygen. Such electrolytic cells, including depolarizing electrolytic cells, are described in U.S. Pat. No. 5,460,705 which description is incorporated by reference herein. A fully passive electrolytic cell for producing ozone is most preferred for small scale point of use applications such as point of use water treatment or built into equipment requiring ozone for disinfecting, decontaminating, washing, etc. The elimination of most moving parts reduces the initial cost of the device and also reduces the potential for failure and the maintenance of the device.

A preferred electrolytic cell that efficiently produces ozone uses a proton exchange membrane (PEM), such as a perfluorinated sulfonic acid polymer sheet, in intimate contact between the anode and cathode catalysts. The anode and cathode catalysts are also in intimate contact with an anode flowfield and a cathode flowfield, respectively. The flow fields make electrical contact with either a bipolar plate disposed between each cell or a current collector plate at the two ends of the cell stack. The anode flowfield is preferably made from a valve metal such as titanium. However, because the valve metals become embrittled from exposure to hydrogen, the cathode flowfield is preferably made from a metal other than the valve metals, such as stainless steel, nickel, copper or combinations thereof.

Preferred anode and cathode flow fields comprise a first region adjacent the PEM that is flat, smooth and porous and a second region that is more open and provides a low-resistance flow path therethrough. The first region provides substantially continuous and even support of the membrane and electrocatalysts so that the membrane and electrocatalysts are not damaged when the cell stack is compressed. The preferred anode flowfield has a first region made of porous, sintered titanium and a second region made of rolled, expanded titanium with each sheet rotated 90 degrees from the next sheet. The anode catalyst, such as lead dioxide ($PbO_2$) may be deposited either on the porous, sintered titanium surface of the anode flowfield or the surface of the PEM. The preferred cathode flowfield has a first region made of stainless steel felt or wool and porous stainless steel and a second region made of rolled, expanded stainless steel. Where the second region is made of expanded metal, it is preferred that at least two sheets of the expanded metal be used and that each of the sheets be turned relative to the previous sheet, most preferably at about 90 degrees. The use of multiple expanded metal sheets substantially eliminates blockages to fluid flow that can occur with a single expanded metal sheet.

Because stainless steel felt can be so easily compressed, a most preferred cathode flowfield comprises stainless steel felt, at least two sheets of rolled expanded stainless steel, and a rigid perforated stainless steel sheet disposed between the felt and the expanded stainless steel. The perforated stainless steel sheet has holes therethrough which are larger than the passages in the felt and smaller than the openings in the expanded stainless steel. The rigid perforated stainless steel sheet provides support for the stainless steel felt and prevents the rolled expanded stainless steel sheet from damaging the stainless steel felt.

The use of a felt, such as stainless steel or titanium, provides the membrane with physical support but is less rigid than a frit and can conform to the membrane or a frit on the opposing side of the membrane. The compressibility of the felt prevents gross distortions or other damage to the membrane while maintaining good contact and support. While felt could be utilized on both sides of the cell, it is generally preferred that felt only be used on one side, either the anode or cathode. However, because the felt is less rigid than a frit, it is preferred that the felt be used on the high pressure side of the cell to avoid collapsing the felt.

The systems of the present invention preferably further comprise a water cooling member disposed in thermal communication with the process water in the anode loop or, preferably, in the cathode loop. Most preferably, the cooling member is designed to maintain the electrolytic cell at a setpoint temperature below about 35° C.—a temperature at which the lifetime of the dissolved ozone, if any, is extended. Without a cooling member of some type, the heat generated by electrical resistance in the electrolytic cell would increase the temperature of the cell, effecting cell operation and net ozone output.

Moving the water cooling members so that thermal management is handled by the cathode loop provides three primary benefits to the overall system. The first advantage involves material compatibility requirements. All components in the anode loop must be suitable for operation with ozone saturated water and many of the components must be materials compatible with ozone gas which is even more aggressive. Therefore, materials used in the construction of the wetted components in the anode loop are preferably selected from titaniun, 316 stainless steel, glass, polytetrafluoroethylene (such as Teflon available from Du Pont de Nemours, E. I. & Co., Wilmington, Del.), and polyvinylidine fluoride (such as Kynar available from Elf Atochem). Conversely, the cathode is a relatively stable system where any material compatible with high quality deionized water system are suitable. Most common materials are suitable for use in the cathode loop, including thermoplastics which are very inexpensive compared to materials suitable for use in the anode loop. Additionally, many of these components may be purchased off the shelf from commercial sources rather than custom manufactured. For example, the cathode reservoir may be made from polypropylene rather than the glass or stainless steel required for the anode reservoir.

Another benefit of moving thermal management to the cathode loop is the increase in ozone output since the amount of water contained in the anode loop may then be minimized. In fact, the anode loop, which must otherwise contain tens of liters of water to cover the cooling member, may contain less than one liter of water. Since ozone has a much shorter half life in water than in gaseous form, a reduction in the amount of water in the anode loop will reduce the continuous demand on the electrolyzer to replace ozone lost to the water. Furthermore, limiting the amount of water in the anode loop allows some or all of the phase separation to occur within the anode components in the electrolyzer stack itself rather than in an external reservoir. This also increases the ozone output since the ozone bubbles spend less time in contact with the water and, therefore, undergo less degradation.

A further benefit of moving thermal management to the cathode loop is that the cooling water circulation pump is relocated from the anode loop to the cathode loop. Mechanical work performed by a circulation pump on water containing dissolved ozone causes damage or degradation to the ozone dissolved in the water. Since the water is saturated with ozone, any ozone that is removed or destroyed, in this case through mechanical work, must be replaced. This destruction of ozone is avoided by moving the circulation pump to the cathode loop.

It is preferred that the system include a battery backup system to maintain a potential across, or a current through, the electrolytic cell(s) during periods of power loss or idle operation. A preferred battery backup system includes a battery connected to the electrolyzer power supply or, if suitably protected, in parallel with the main supply. Maintaining this potential across the electrolytic cell has been found to increase the life of the lead dioxide electrocatalyst, which experiences a decrease in ozone production capacity following a complete loss of electrical potential. Furthermore, maintaining current through the electrolytic cell(s) also improves the turn on response allowing the system to rapidly come to full output.

A hydrogen destruct unit may be disposed in communication with the hydrogen discharge from the hydrogen phase separator. The hydrogen destruct comprises a catalyst such as a noble metal (e.g., platinum or palladium) in which hydrogen is allowed to combine with oxygen, preferably from free ambient air or forced air, without a flame resulting in the formation of heat and water vapor. Likewise an ozone destruction unit or "ozone destruct" may be disposed in communication with the ozone discharge from the anode reservoir phase separator. The amount of ozone that is produced and separated but not used by some ozone consuming process is catalytically destroyed on contact. The ozone destruct comprises a catalyst, such as $Fe_2O_3$, $MnO_2$, or a noble metal (e.g., platinum or palladium). The operation of this ozone destruct sub-system is further enhanced by placing it in thermal communication with the hydrogen destruct unit. In this manner the waste heat generated by the catalytic combination of hydrogen gas with ambient air and the heat generated from the degradation of ozone to oxygen may be utilized as high grade waste heat. One such example of the utilization of this waste heat would be the distillation of the ozone generation system feed water to improve the water quality. Another application would be the heating of water for use in an unrelated process, such as central heating, clothes washing or domestic hot water. This source of high grade heat could be used in addition to the medium grade waste heat available from the cooling system.

The electrolyzers of the present invention are capable of efficiently generating both the anode and cathode gases at elevated pressures. This high pressure capability allows the anode reservoir to build and maintain pressures higher than that of the feed water that is used to fill the anode. This is accomplished by placing a back flow prevention device on the feed water inlet to the anode reservoir and a means of relieving the anode pressure. When the anode pressure is relieved and maintained below that of the source water, feed water free flows into the anode reservoir. When the pressure within the anode reservoir is allowed to build and water not allowed to exit, pressures within the reservoir will rise. Likewise, the cathode system will deliver hydrogen gas at the elevated pressure or below.

Preferably a pressure relief member is provided in each reservoir such that a maximum design pressure is not exceeded. This may be provided only for the liquid or for both the liquid and gas, but should not be provided for the gas alone, since the hydrophobic membrane will not allow water to escape from the anode reservoir.

FIG. 1 is a schematic diagram of a self-controlled ozone generator 10 which operates solely on electricity and water, preferably either deionized, distilled, or reverse osmosis (RO) water. The heart of the ozone generator 10 is a stack 12 of electrolytic cells (two shown) 14 separated by bipolar plates (one shown) 16 and sandwiched between a positive end plate 18 and a negative end plate 20. Each of the two cells 14 have an anode compartment 22 and a cathode compartment 24 separated by a proton exchange membrane 26. The cells are constructed in a generally similar manner as those cells described in U.S. Pat. No. 5,460,705, which description is incorporated by reference herein, with the primary differences being set out above. The flow of fluid in and out of the anode and cathode compartments is schematically shown in FIG. 1 as passing through framing members 28 for purposes of simplicity. However, it should be recognized that the fluids may actually pass through manifolds formed by adjacent framing members 28, bipolar plates 16, proton exchange membranes 26 and the like which communicate the fluid to openings in the end plates 18, 20.

The anode compartment 22 is shown receiving water from an anode reservoir 30. The anode reservoir 30 also serves as a liquid/gas separator wherein oxygen and ozone generated in the anode compartment 22 diffuses from the water and collects at the top of the reservoir 30. The reservoir 30 preferably includes a stand pipe 32 which enhances the liquid/gas separation.

The water in the anode reservoir 30 is gravity fed back to the anode compartments 22. As water is consumed by the electrochemical reaction which produces oxygen and ozone, water may be added to the anode reservoir from a deionized water source 38 or from the cathode reservoir 40, as will be described in greater detail below.

The cathode reservoir 40 holds deionized water which rises from the cathode compartments 24. The cathode reservoir 40 also serves as a liquid/gas separator wherein hydrogen generated in the cathode compartments 24 diffuses from the deionized water and collects at the top of the reservoir 40. The wet hydrogen passed through the cathode reservoir can be collected and used or flared.

The anode reservoir 30 and the cathode reservoir 40 are preferably in communication with each other and a source of deionized (DI) water 38. While these components may be communicated in a variety of ways, it is preferred that the system remain simple and include a minimal number of valves and couplings. One preferred configuration is shown in FIG. 1 having tubing that includes a pump 54 between the reservoirs 30, 40 and a first shut-off valve 56 between the DI water source 38 and the cathode reservoir 40. It is also preferred to have tubing that provides a drain loop having a second shut-off valve 58 between the anode reservoir 30 and the drain 62 and a third shut-off valve 60 between the DI source 38 and the drain 62 for bypassing the first shut-off valves in order to flush or drain the system. These three solenoid valves 56,58,60 and the four level sensors 35,46, 50,52 are used to maintain the water level in the two reservoirs 30,40.

A cooling member 64 is disposed in a thermal relationship with the water in the cathode reservoir 40. A cooling fluid is circulated through a cooling cycle that includes a condenser 66 and a compressor 68. While only about three windings of the cooling coil 64 are shown in this schematic view, any number of windings may be used to accomplish sufficient cooling to maintain a desired water temperature. The preferred heat exchanger is a spirally wound parallel plate freon/water exchanger such as those available from Elanco, Inc. of Newark, Del.

The ozone generator 10 also includes a main power supply unit 70 and a power converter 72 for converting AC current to DC current for operation of the array of electrolytic cells 12. The main power supply unit 70 preferably provides electrical power to all electrically powered devices in the generator 10 through appropriate electrically conducting wires. The generator 10 preferably includes a battery 74 which is used to backup the main power supply unit 70 during electrical interruptions and to provide smooth DC power to the system controller 44. The battery 74 is preferably continuously charged by a battery charger 76 in order to maintain the battery 74 at a full charge. The main power supply unit 70 and the battery charger 76 are directly connected through electrical line 78 to some external source of AC electrical power, such as a standard household electrical line or a gasoline powered generator for remote use. The current output of the battery backup is significantly less than the main power supply. This minimum current may range from about 1 amp down to about 1 milliamp or less.

The ozone generator 10 is preferably self-controlled by a system controller 44 which receives various signals from sensors and switches and sends control signals to valves, pumps, switches and other devices shown in FIG. 1. The system controller 44 executes system control software stored in a memory. The software is programmed to monitor the various signals indicating the operating conditions of the system and to control various devices in accordance with those conditions. It should be recognized that the programming of the system controller may take on any of a great number of schemes within the scope of the present invention and include additional, non-essential programming, such as system diagnostics, communications, data storage and the like. Further, the system may include additional devices and monitors not shown or described herein, such as an on/off switch.

During operation of the ozone generator 10, the DI water source 38 preferably provides water at a pressure higher than the normal operating range of the anode reservoir 30 and the cathode reservoir 40 so that deionized water can be added to the system during normal operation. Reservoirs 30, 40 are preferably designed to operate in a range between about 0 and about 30 psig, and deionized water is conveniently provided to the system at about 50 psig. During initial start-up of the generator, the valves 54, 56 connecting the reservoirs 30,40 and the DI water source 38 are open, but the valves 58, 60 leading to a system drain 62 remain closed. Deionized water fills the anode compartments 22 and the cathode compartments 24. Providing additional DI water into the system raises the level of water in either reservoir 30, 40 to the high level sensors 46, 50 by letting trapped air escape from the reservoirs 30, 40, respectively, to maintain system pressure below about 30 psig. When the reservoirs are filled, the flow of deionized water is stopped by the second shut-off valve 56. Recirculation of water in the cathode reservoir 40 by the pump 36 and cooling of the water within the reservoir 40 by the cooling member 64 will preferably occur when electric current is applied to the array of electrolytic cells 12. The transfer pump 54a will cycle so that water carried through the proton exchange membranes 26 from the anode compartments 22 to the cathode compartments 24 can rise into the cathode reservoir 40 and eventually be returned to the anode reservoir 30.

The DI water source 38 may comprise any makeup water source, such as potable water, and a water purifying system. One preferred purifying system suitable for use with potable water includes a carbon filter bed followed by an ion exchange resin bed. It is also preferred that at least a portion of the cathode water loop be circulated through a purifying system in order to maintain the quality of the recirculating water in the cathode loop. One preferred purifying system suitable for use in the cathode loop includes a carbon filter bed 71 followed by an ion exchange resin bed 73.

The system of FIG. 1 shows a main cathode water loop including a cathode reservoir 40, a recirculation pump 36, a heat exchanger 64 and the electrolyzer 12. The system may further include a side loop in communication with the main cathode water loop, wherein the side loop directs a portion of the recirculated water through a purifying system, preferably comprising the carbon filter bed 71 (primarily to destroy and ozone that may be in the water) and the ion exchange bed 73.

The heat exchanger or cooling member 64 is shown as a coil of tubing that circulates a cool fluid from a refrigeration system comprising a compressor 68 and a condenser 66. It should be recognized that the cooling member may be any of a number of various designs known in the art and may include various support components or utilities (not shown). The cooling member or system may control the temperature of the water in cathode water loop in various manners, such as cycling a condenser unit on and off according to a thermocouple in thermal communication with the cathode water or any other portion of the system, including the anode where much of the heat is generated.

Figure 2:
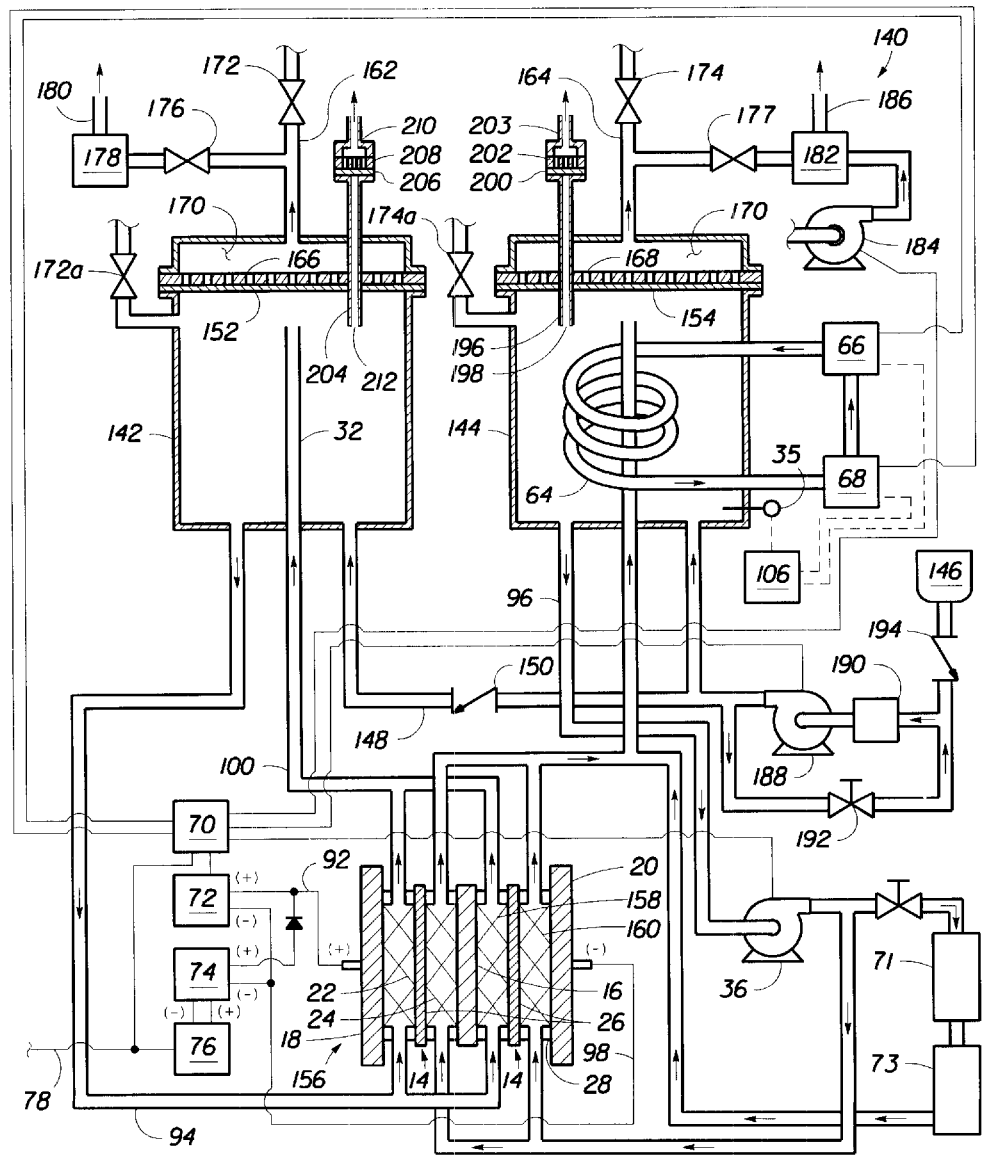
FIG. 2 is a schematic diagram of a passive ozone generator which operates without a solenoid controller, solenoid valves or level sensors.

FIG. 2 is a schematic diagram of an alternate ozone generator 140 which operates without a controller, valves or level sensors. The ozone generator 140 performs a similar process as the ozone generator 10 of FIG. 1, but has been modified to operate in a completely passive manner without the requirement of a control system, valves, or level sensors. The generator 140 eliminates all solenoid valves (or float switches) 56, 58, 60, a pump 54a, all level sensors 35, 46, 50, 52 and the control system 44 that are part of generator 10 of FIG. 1.

The passive generator system 140 provides all water handling requirements and maintains a full water level in the anode reservoir 142 and cathode reservoir 144. These reservoirs 142, 144 are both placed in direct communication with the deionized water source 146. The fluid line 148 between the cathode reservoir 144 and the anode reservoir 142 is small in diameter to provide a sufficiently rapid fluid flow from the cathode reservoir 144 to the anode reservoir 142 so that ozone dissolved in the anode water is not allowed to diffuse into the cathode reservoir 144. A back flow prevention device 150 prevents water or gas flow from the anode reservoir 142 to the cathode reservoir 144.

Water may be held in the reservoirs using hydrophobic membranes or phase separators 152, 154 that prevent the liquid water from escaping out of the tops of the reservoirs 142, 144. These hydrophobic phase separators 152, 154 provide a barrier to water in its liquid state, but allows the free transmission of gases such as water vapor, hydrogen gas, oxygen gas, and ozone gas. The separators 152, 154 allow water from the deionized water source 146 to displace any gases in the reservoirs 142, 144 during initial filling. After all the gases are eliminated from the reservoirs 142, 144 and the water is in direct contact with the hydrophobic membranes 152, 154, then the transfer of water ceases as the pressures in the reservoirs 142, 144 equalize with that of the water source 146. The water in each reservoir 142, 144 continuously remains at this level during all phases of operation so long as the supply of water is maintained. Pressure relief valves 172a and 174 a are preferably provided to relieve high water pressure before damaging the hydrophobic membrane.

During normal operation of the ozone generation system 140, gas bubbles are generated in the electrolyzer 156 and then transferred to the water reservoirs. Oxygen and ozone gas bubbles generated in the anode compartments 158 of the electrolyzer 156 are transferred to the anode reservoir 142 and hydrogen gas bubbles generated in the cathode compartments 160 are transferred to the cathode reservoir 144 where the gas bubbles rise to the top surface of their respective reservoirs into contact with the hydrophobic membranes 152, 154. The hydrophobic membranes provide little or no restriction to the transmission of gas and water vapor from inside the reservoirs, at elevated pressure, to the vent lines 162, 164. The separators 152, 154 are suitably supported by support structures 166, 168 which provide free flow of gas and any condensed liquid, but provide sufficient support of the membranes so that pressure differentials between the water in the reservoirs and the gas in the vent lines may possibly exceed about 100 psi. The membrane 152 and the support 166 are in turn provided with mechanical support and liquid and gas sealing by the vessel top 170. The ozone/oxygen vent 162 is in direct communication with the dry side of the membrane 152 allowing the gas previously contained in the bubbles to leave the anode reservoir. Likewise, the hydrogen vent 164 is in direct communication with the dry side of its membrane 154 allowing the hydrogen gas previously entrained in bubbles to leave the cathode reservoir 144.

A pressure regulator 172 may be added to allow the pressure of the oxygen and ozone gas on the dry side of the membrane 152 to reach any value up to the pressure of the liquid within the vessel 142. In a similar manner, a pressure regulator 174 may be added to the hydrogen vent 164 to control the hydrogen delivery pressure. The pressure regulators 172, 174 may be operated independently of each other allowing the gases from the anode reservoir 142 and the cathode reservoir 144 to be regulated individually at gas pressures from sub-ambient up to the pressure of the water which is common to both the anode reservoir 142 and the cathode reservoir 144. Overpressure regulators 176, 178 may be added to prevent overpressurizing the system in the event that the main discharge vents 162, 164 become blocked or surplus gas is produced. Additional pressure relief valves 172a, 174a prevent the water pressure in the reservoirs from exceeding design limits. Ozone exiting the pressure release valve 176 may be destroyed using a catalytic destruct unit 178 before the gas is released through vent 180 to the atmosphere. Surplus hydrogen, or that resulting from Over pressure gas, may be destroyed in a catalytic destruct unit 182 that reacts the hydrogen gas with oxygen from the air provided by an air pump 184. The resulting water vapor and surplus air is released through a vent 186 to the atmosphere. The two destruct units 178, 182 may be placed in thermal communication with each other so the waste heat from the hydrogen/oxygen combination reaction will assist in the destruction of the ozone gas.

An optional boost pump 188 may be added between the deionized water source 146 and the water reservoirs 142, 144. To further condition the water, a resin bed 190 may be added to the water source line. It is preferred to further include a return loop containing flow rate adjusting means 192 in order to continuously polish the incoming water. A back flow prevention device 194 is useful to prevent water from returning to the source 146.

An auxiliary vent system in the cathode reservoir 144 prevents the transfer of hydrogen gas from the cathode reservoir 144 to the anode reservoir 142 in the event of an interruption of the water supply. This is accomplished using a dip tube 196 that extends downward in the cathode reservoir 144 to a point 198 above the bottom of the reservoir which defines the minimum acceptable water level. The dip tube 196 extends upward out of the reservoir and communicates with a hydrophobic membrane 200 with suitable support and housing 202. When the water level is above point 198 and the reservoir is under pressure, water forces any gas in the tube 196 through the hydrophobic membrane 200 and out the vent 203 which is at atmospheric pressure or below. Should the water in the cathode reservoir drop below point 198, the water presently in the tube will drain back out of the tube 196 into the reservoir 144 allowing the gas within the cathode reservoir 144 to escape up the dip tube and out the vent 203. In this manner, the pressure in the reservoir 144 is reduced down to ambient pressure to prevent any further transfer of liquid from the cathode reservoir to the anode reservoir.

The anode reservoir 142 preferably includes a similar auxiliary vent system having a dip tube 204, hydrophobic phase separator 206, housing 208, and vent 210. Through some event, such as pressure fluctuations in the incoming water, if the pressure in the anode reservoir 142 is higher than the pressure in the cathode reservoir 144, then the pressure driven transfer of water from the cathode reservoir to the anode reservoir will stop. When the water level in the anode reservoir falls below the lower opening 212 of the dip tube 204, the pressure within the anode system is reduced and the pressure driven water transfer from the cathode reservoir to the anode reservoir is reestablished.

The rest of the system 140 may remain unchanged from that of generator 10 of FIG. 1. Therefore, system 140 may include a cathode recirculation pump 36, a power supply 70, a cooling system 66, and a standpipe 32. The cooling system 64, 66, 68 may be operated by an electrical or mechanical temperature controller 106 and a temperature sensor 35 in direct communication with the condenser system and the body to be temperature regulated, shown as the anode reservoir water in FIGS. 1 and 2 but which body may be the anode end plate or any other location representative of the electrolyzer temperature. The power supply unit 70 may also operate in an autonomous mode with self-control of the power output to match ozone demand. A thermal cut out switch may be utilized to remove power from the electrolyzer should a threshold temperature be exceeded.

Ozone gas is preferably generated by an electrolytic method which offers both process and cost benefits. In the electrolytic method, ozone is generated by the electrolysis of water using a special electrolytic cell. Sources of electrical power and water are the only requirements for producing $O_3$ electrochemically. Unlike the ozone gas produced by the corona process, electrolytically generated ozone does not contain toxic by-products. The electrolytic reactions occur by applying DC power between the anode and cathode which are placed on either side of a proton-exchange membrane (PEM), preferably a perfluorinated sulfonic acid polymer membrane (such as NAFION 117 available from DuPont de Nemours, Wilmington, Del.). Water is fed to the anode catalyst where water oxidation takes place resulting in both the thermodynamically favored $O_2$ evolution reaction and the $O_3$ formation reaction.

Utilization of high over potentials and certain electrode materials selectively enhance $O_3$ formation at the expense of $O_2$ evolution. The water oxidation reactions yield protons and electrons which are recombined at the cathode. Electrons are conducted to the cathode via the external circuit. The protons and electrons are recombined at the cathode in the presence of water to form hydrogen gas.

The use of a PEM instead of a liquid electrolyte offers several advantages. First, fluid management is simplified and the potential for leakage of corrosive liquids is eliminated. Second, the PEM/anode interface provides a chemical environment which is well-suited to the electrochemical $O_3$ reaction. A PEM based on a fluoropolymer, such as a perfluorinated sulfonic acid polymer, displays very high resistance to chemical attack.

Figure 3:
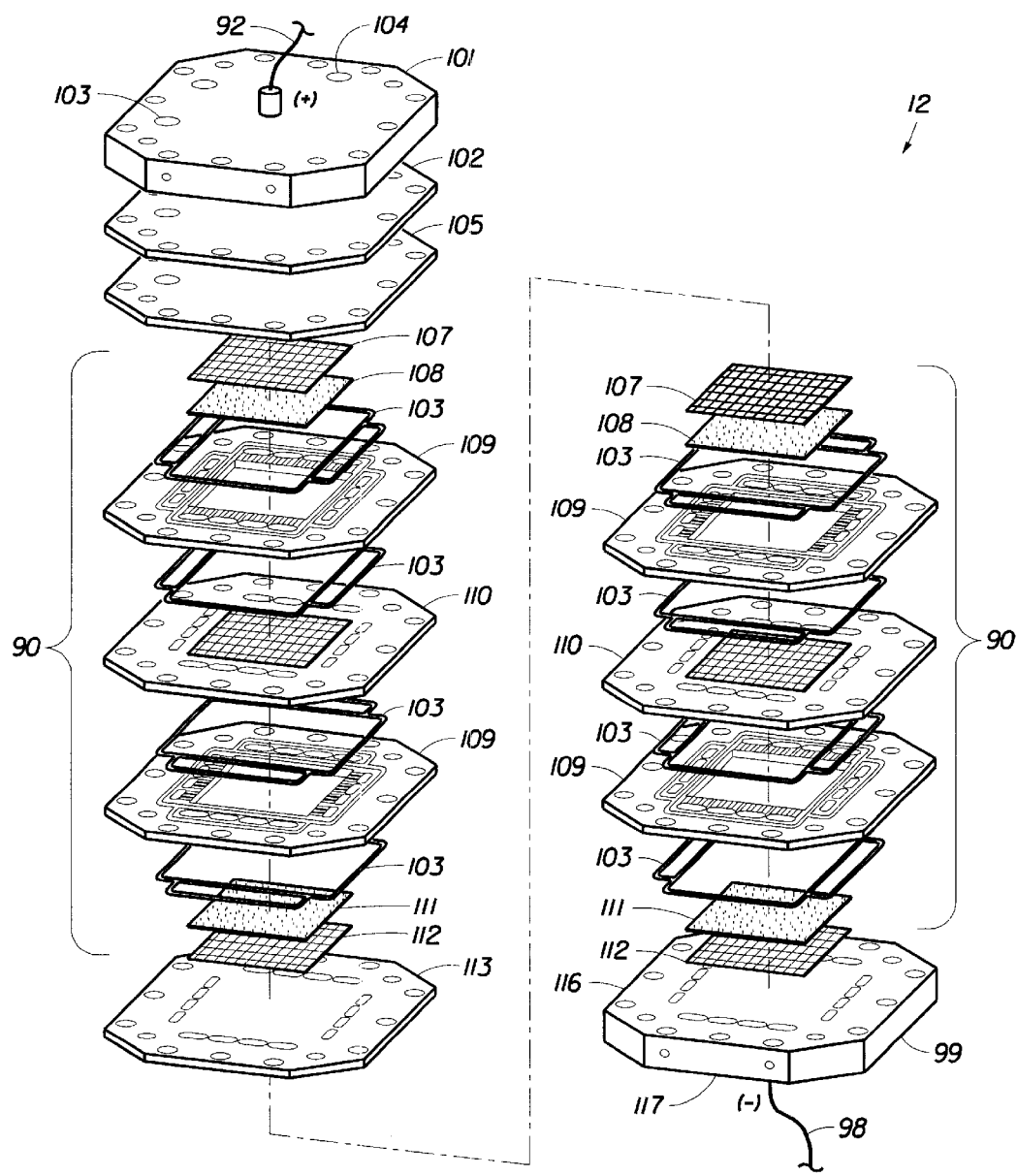
FIG. 3 is an exploded view of an electrochemical cell stack suitable for the production of ozone.

FIG. 3 is an exploded perspective view of the electrolytic cell stack 12 for the production of ozone. The cell stack 12 may include any number of individual cells, but is shown here with two cells 90 which are similar in construction and operation. Each cell 90 comprises an expanded titanium flowfield 107, a porous titanium member 108 having a lead dioxide catalyst deposited on its surface facing the PEM 110, and a cell frame 109 disposed around the flowfield 107 and member 108. The PEM 110 may be either coated with a cathodic catalyst, such as platinum, facing the porous stainless steel sheet 111 or be placed in contact with a carbon fiber paper (not shown) that has the cathodic catalyst formed thereon. A porous stainless steel sheet 111 is placed against the cathodic catalyst surface, followed by a rolled, expanded stainless steel flowfield 112 which may include a plurality of sheets. Another cell frame 109 is disposed around the sheet 111 and flowfield 112. A bipolar plate 113 is disposed between the two cells 90 to allow electronic conduction between the adjacent stainless steel flowfield 112 and the adjacent titanium flowfield 107. The system may include an additional bipolar plate 105 and a flowfield 102 between the anode flowfield 107 and the end plate 101 of the electrolyzer to eliminate contact of the end plate 101 with ozone. While not shown, the plate 105 and flowfield 102, or some other intermediate member, may be used with both endplates to eliminate contact of the endplates with the same or different fluids within the cell.

The two endplates 101, 116 are drawn together to compress all the components of the electrolytic cell stack 12 into a filter press type arrangement in which adjacent components are in intimate contact. The cell frames 109, membranes 110, bipolar plate 113, the current collector face plate 116, and the like are sufficiently compressed to provide a sealing engagement and collectively form manifolds for the delivery and withdrawal of fluids in the cell stack 12.

Figure 4:
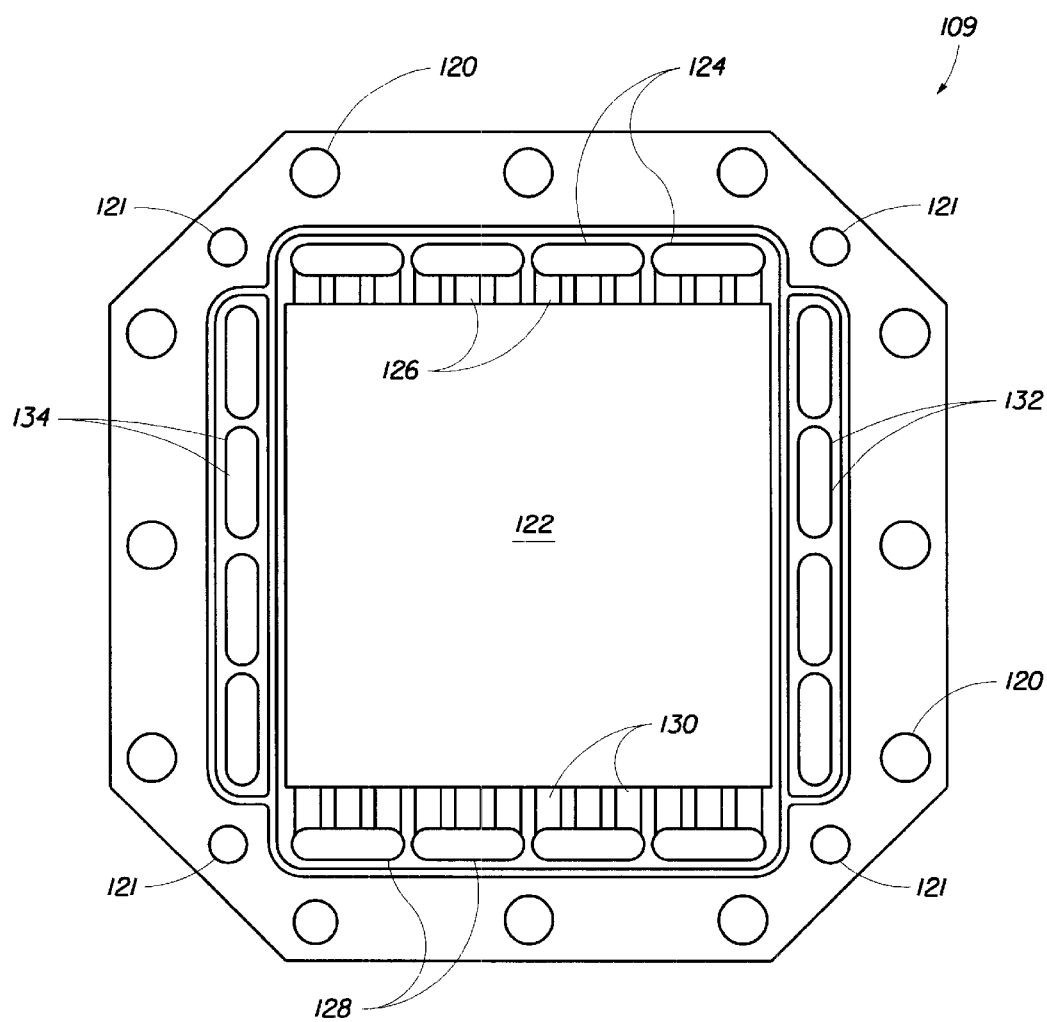
FIG. 4 is a face view of a cell frame shown in FIG. 3.

FIG. 4 is a front view of the cell frame 109 suitable for use in the electrolytic cell of FIG. 3. The cell frame 109 has a plurality of bolt holes 120 and alignment holes 121 around its perimeter edge for aligning and securing the cell frame in place with adjacent membranes 110, bipolar plates 113 or current collector face plates 106. The cell frame 109 has a center region 122 that is open to receive a flowfield and electrode, such as the expanded titanium flowfield 107, the porous titanium sheet 108 and the electrocatalyst formed on the sheet 108. A first manifold is provided by the row of holes 124 which may, for example, supply water to the center region 122 through the slots 126. The water flowing through the center region 122 is then preferably collected in the opposing manifold, which is comprised of the holes 128 and slots 130, and withdrawn from the cell stack. It should be recognized that the holes 124, 128 in both manifolds are lined up with and communicate with similar holes through adjacent components of the cell stack 12 (See FIG. 3). In the example just given, the water is delivered through holes 128 and slots 130 and passed through the titanium flowfield 107 and the porous titanium sheet 108 to the electrocatalyst where oxygen and ozone are produced. The ozone containing water is withdrawn through the slots 126 and holes 124 out of the cell stack to the anode reservoir. Conversely, the manifold formed by holes 132 and the manifold formed by holes 134 allow passage of fluids therethrough to another cell frame (not shown), such as a cell frame around a stainless steel flow field 112 and a porous stainless steel sheet 111.

Figure 4A:
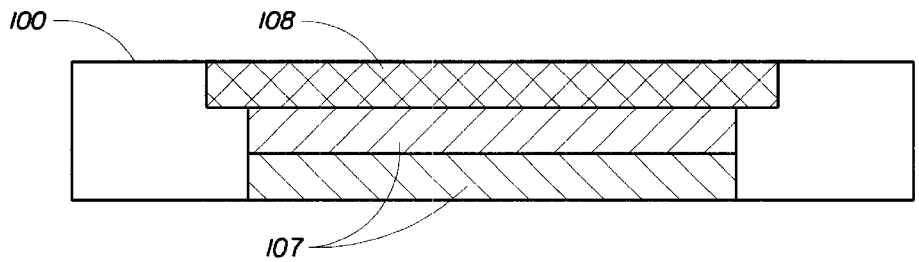
FIG. 4a is a cross-sectional view of a frame formed around several components of a cell.

FIG. 4a is a cross-sectional view of a frame formed around several components of a cell. The frame 109 may be used to secure a titanium frit or felt member 108 and a flowfield or plurality of flowfields 107 together in a common subassembly. In this manner, intimate contact between the member 108 and the flowfields 107 is maintained while avoiding slippage or rubbing therebetween. Movement of the frit 108 can result in a shearing force acting upon the membrane 110 (See FIG. 3) positioned against the frit 108. Preferably, the frit is inserted into an injection molded frame to provide an absolutely flush and flat surface against the membrane. Alternatively, the frame may be provided with a ledge to hold the frit from moving.

Figure 4B:
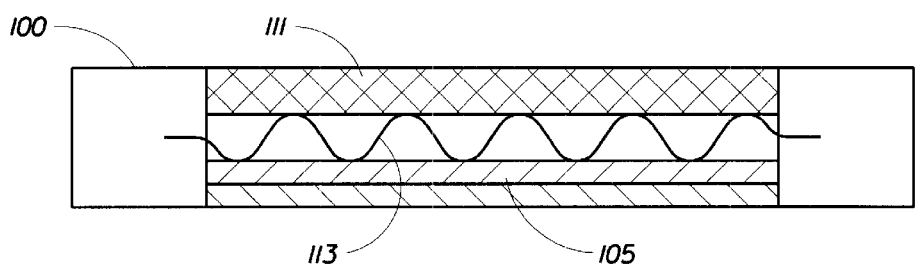
FIG. 4b is a cross-sectional view of an alternate frame formed around several components of a cell.

FIG. 4b is a cross-sectional view of an alternate frame 109 formed around several components of a cell. The frame 109 is shown here securing titanium felt 108a (cathode side), a perforated metal sheet 108b to support the felt, a corrugated bipolar plate 113 and a porous titanium sheet 111 (anode side). Alternatively, the titanium felt 108a and sheet 108b may be replaced by a titanium frit. To reduce component cost and minimize component count, the bipolar plate is preferably textured or corrugated and molded into the frame. The textured or corrugated plate 113 provides rigid support between members 108a/b and 111 while also providing a flowfield on both sides of the plate 113. The frame is molded with flowchannels communicating with the flowfields on both sides of the plate 113. The plate would then function as both a bipolar plate and as flowfields for both the anode and the cathode.

Figure 5:
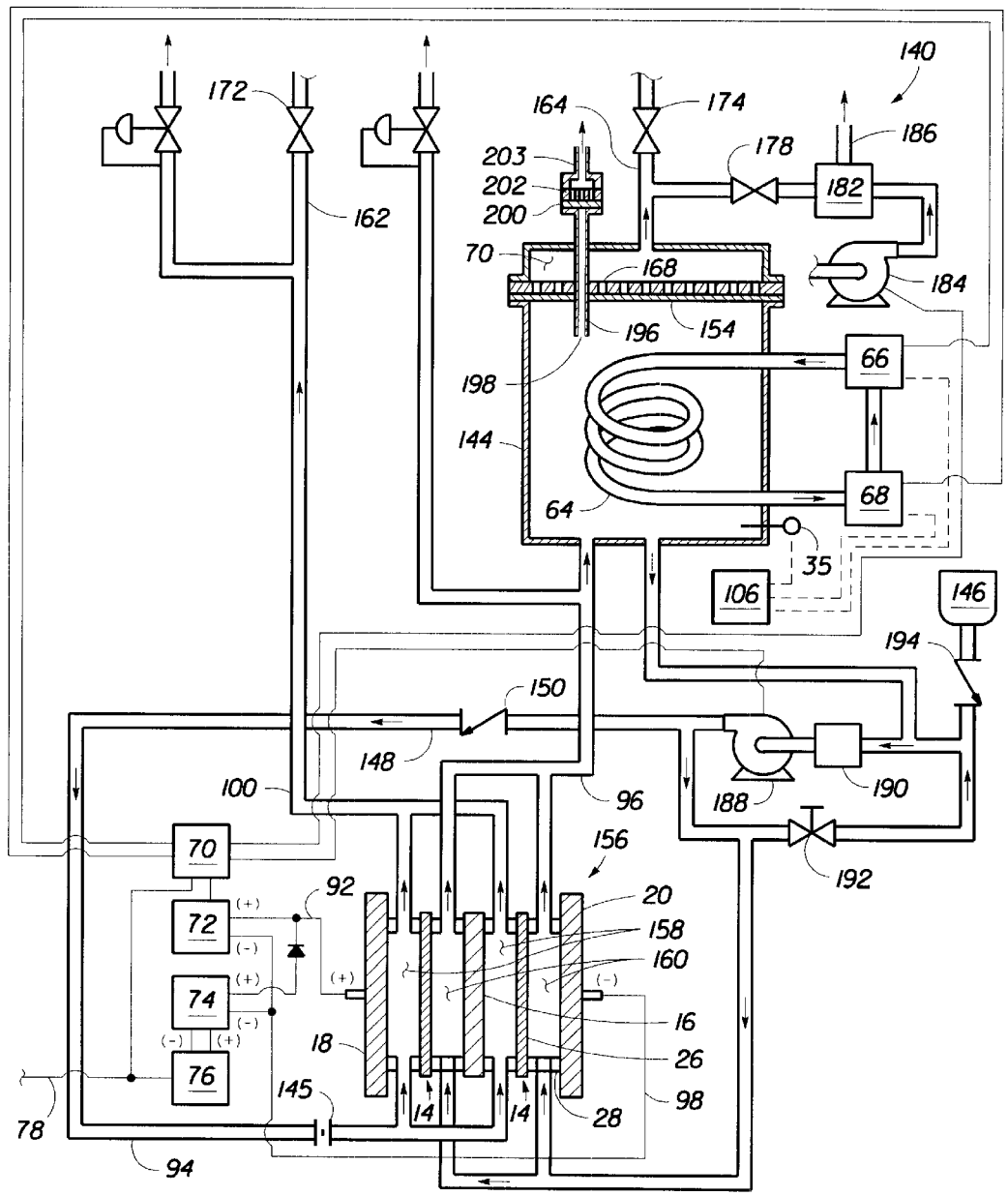
FIG. 5 is a schematic diagram of a passive ozone generator that operates without an anode reservoir.

FIG. 5 is a schematic diagram of the passive ozone generator 140, as in FIG. 2 except that it operates without the anode reservoir 142 and associated piping and instruments. Instead of the anode reservoir, the generator 140 provides water to the anodes 158 from the cathode reservoir 144. A flow restriction or orifice 145 is disposed within the tubing 94 to limit the amount of water being delivered to the anodes 158. Preferably, the orifice 145 provides water transfer from the cathode loop into the anode loop at a well characterized rate sufficient to keep the anode full of water under all operating conditions, particularly accounting for water consumed by ozone production, water electroosmotically transported to the cathode and water vaporized into the ozone gas stream. Furthermore, it is preferred not to provide so much water to the anodes that water will pass into the outlet tubing 100 and out the valve 172 along with the ozone gas.

Figure 10:
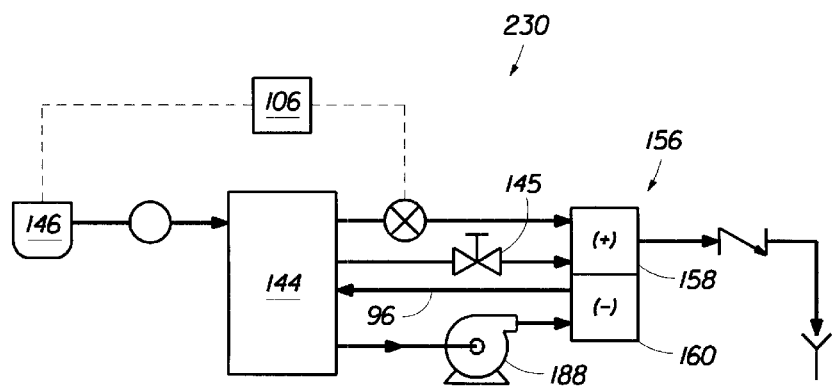
FIG. 10 is a partial schematic diagram of an ozone generator having an orifice disposed between the cathode reservoir and the anode and an anode flushing system.
Figure 6:
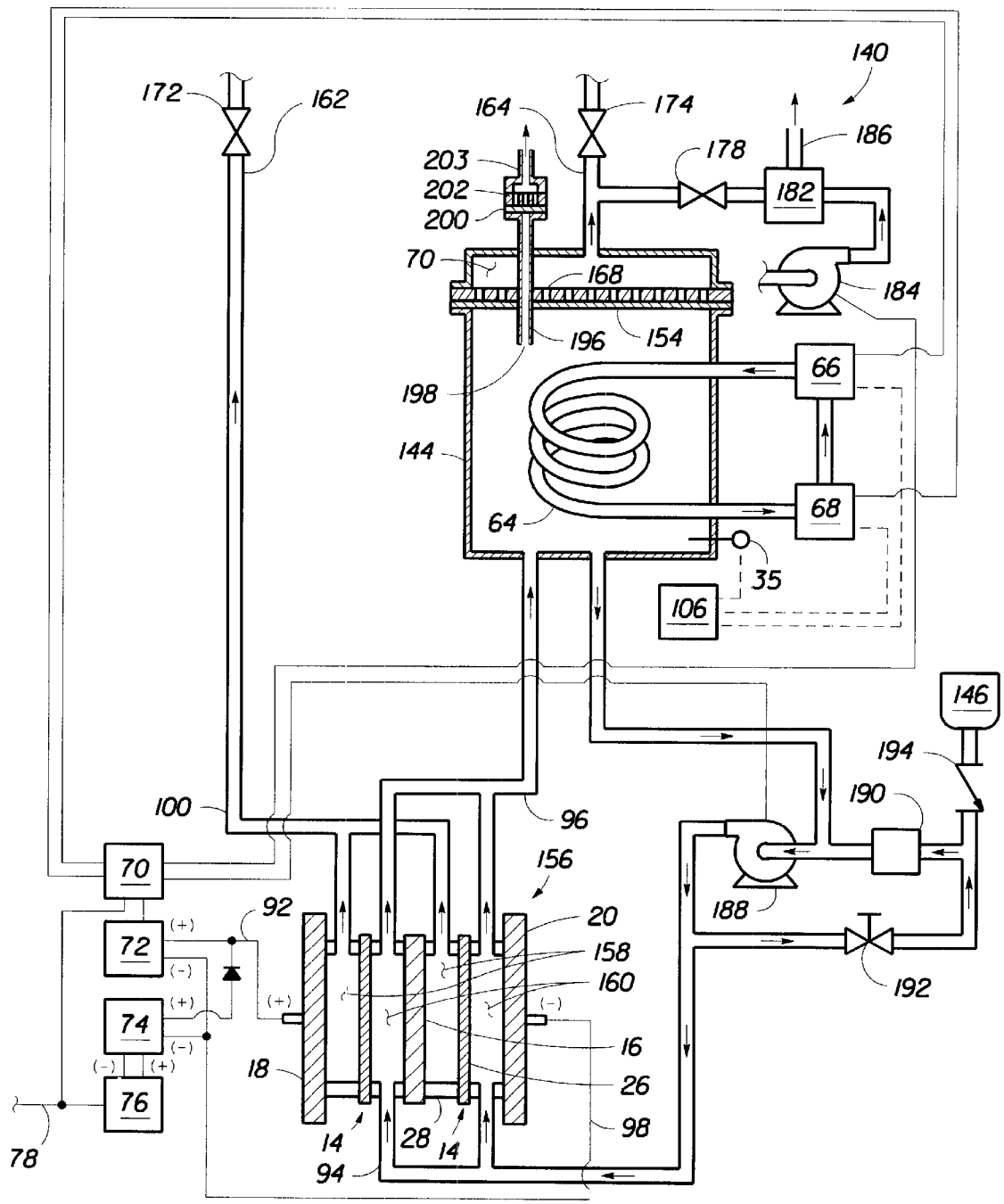
FIG. 6 is a schematic diagram of a passive ozone generator that operates without an anode reservoir and relies upon back diffusion of water from the cathode to the anode.

FIG. 10 is a partial schematic diagram of an ozone generator 230 having an orifice 145 disposed between the cathode reservoir 144 and the anode 158 and an anode flushing system. The orifice 145, as in FIG. 5, provides water to the anode as it is utilized. Since there is little or no water flowing out of the anode compartment 158, contaminant may accumulate over time and reduce production of the cell. The anode flushing system allows the anode compartment 158 to be flushed periodically by bypassing the orifice 145 or otherwise providing a flow of fluid, FIG. 6 is a schematic diagram of the passive ozone generator 140, as in FIG. 5 except that it operates without any direct supply of water to the anodes 158, but rather relies upon back diffusion of water from the cathodes 160 to the anodes 158. In this embodiment, the water tubing 94 and the orifice are eliminated, thereby reducing the amount of equipment and further simplifying the operation of the generator. Because the cathode loop comprising the inlet tubing 94, the cathodes 160 and the outlet tubing 96 are maintained water full, the supply of water in the cathodes 160 should always be available for back diffusion to the anodes 158. It is preferred that the water in the cathode loop is circulated, most preferably continuously circulated.

Figure 7:
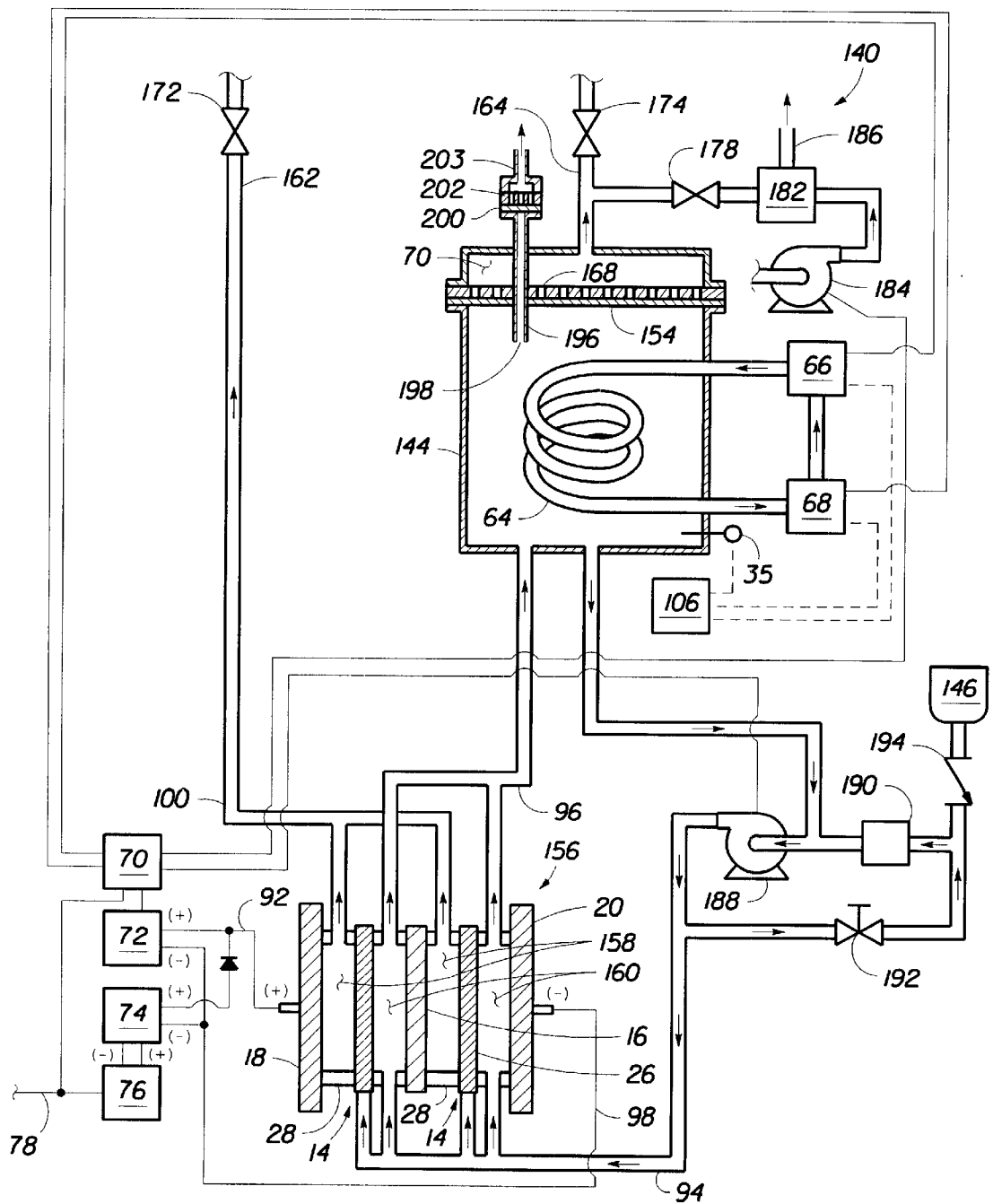
FIG. 7 is a schematic diagram of a passive ozone generator that operates without an anode reservoir and supplies water to a tubulated proton exchange membrane.

FIG. 7 is a schematic diagram of the passive ozone generator 140, as shown in FIG. 6 except that it further provides for water to be supplied directly to the proton exchange membrane 14 which is tubulated. The tubulated membranes are beneficial to provide more water to the anode catalyst than by mere back diffusion from the cathodes 160. It is important that sufficient amounts of water be supplied to the anode to provide water for the ozone production reaction, account for water losses due to electroosmosis from the anode to the cathode, and prevent drying of the membrane which causes the electrical resistance in the membrane to increase.

As previously discussed, it is useful in many applications to have an ozone containing water stream. In some of these applications, it is necessary that the ozone containing water stream comprise high quality water and/or be free from certain contaminants. For example, ozone may be introduced into a drinking water stream or a rinse water stream for semiconductor fabrication in order to oxidize any contaminants therein. While an ozonated anode water stream could be used, the anode water source may not be of sufficiently high quality or purity or the ozonated anode water may pick up contaminants, such as lead, from the electrolyzer itself. Therefore, in accordance with the present invention, ozone may be disengaged from the anode water and then re-engaged with a second water source of suitable quality. Disengagement provides an ozone gas stream free of all non-volatile contaminants, such as lead, particulates and other organics or inorganics. Re-engagement into the second water source then provides the desired process stream.

Disengagement and re-engagement may be accomplished by keeping the anode water physically separated from the process water with either a vapor gap or a hydrophobic membrane. The distribution of contaminants, such as lead, within the process water, or the process in which it is used, is thereby eliminated.

Figure 8:
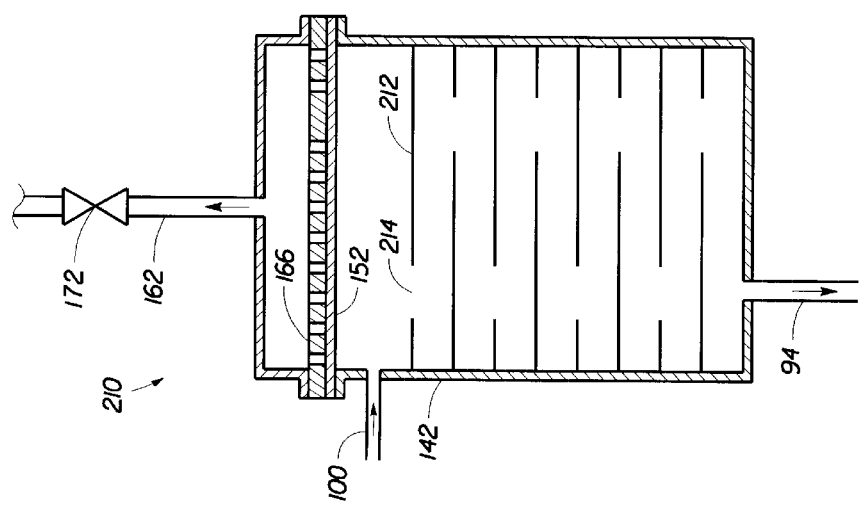
FIG. 8 is a cross-sectional view of an ozone engaging system with baffles to provide counter-current flow of ozone into water.

FIG. 8 is a cross-sectional view of an ozone engaging or re-engaging system 210 having internal baffles 212 and internal openings or channels 214 designed to provide contact between ozone gas and the process water contained therein. Preferably, the ozone and water streams are provided in a counter-current flow with the water flowing downward and the ozone gas bubbles having a tendency to rise. The baffles 212 may be designed in any variety of ways known in the art, but preferably will reduce or prevent circulation of tie water stream introduced through line 216 within the system 210 so that an ozone concentration gradient can be established with the highest concentrations of ozone being contained in the water in the lower portion of the system 210 where the ozonated water is withdrawn through the outlet tubing 218. The baffles 212 resist a substantial portion of natural circulation currents that may be caused by temperature gradients, rising ozone bubbles, water flow and the like. However, the ozone gas bubbles are allowed to slowly rise through the channels 214 to the top of the system 210. Excess ozone rises through the water to the membrane 152 which allows the ozone to pass therethrough and exit through line 219 for disposal or reuse.

Figure 9:
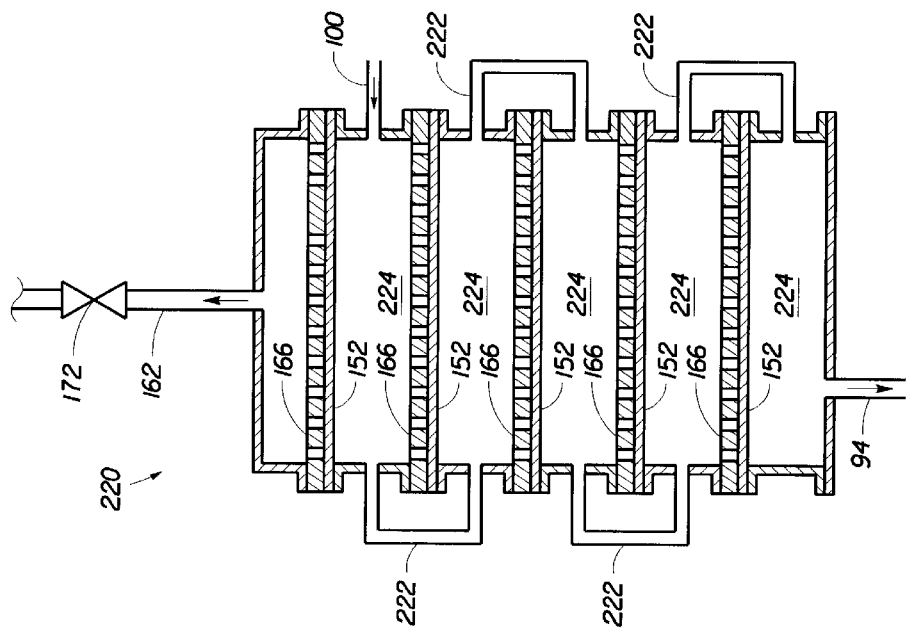
FIG. 9 is a cross-sectional view of another ozone engaging system with internal hydrophobic membranes and external water flow members.

FIG. 9 is a cross-sectional view of another ozone engaging or re-engaging system 220 having multiple internal hydrophobic membranes 152 and external water flow members 222. The hydrophobic membranes 152, preferably each supported by a perforated plate 166, define intermediate chambers 224 which are water full. Water enters the upper chamber 224 from a water source through tubing 216. Ozone gas is allowed to pass through the membranes 152 into the next higher chamber 224. The ozone gas continues upward in this manner, passing through each membrane 152 and, if the ozone is not ultimately engaged in the process water, out the line 219. Conversely, the process water flows downward through the chambers 224 and can only rise or fall between chambers 224 through the external water flow members 222. In this manner, circulation of water throughout the system 220 is reduced or eliminated while allowing ozone to pass through the reservoir. Furthermore, an ozone concentration gradient may be established with the highest ozone concentrations being maintained in the water in the lower chambers 224 where it is withdrawn for use through tubing 218. It should be recognized that other configurations and methods may be used to achieve reengagement of ozone in water, for example through the use a packed column.

Figure 11:
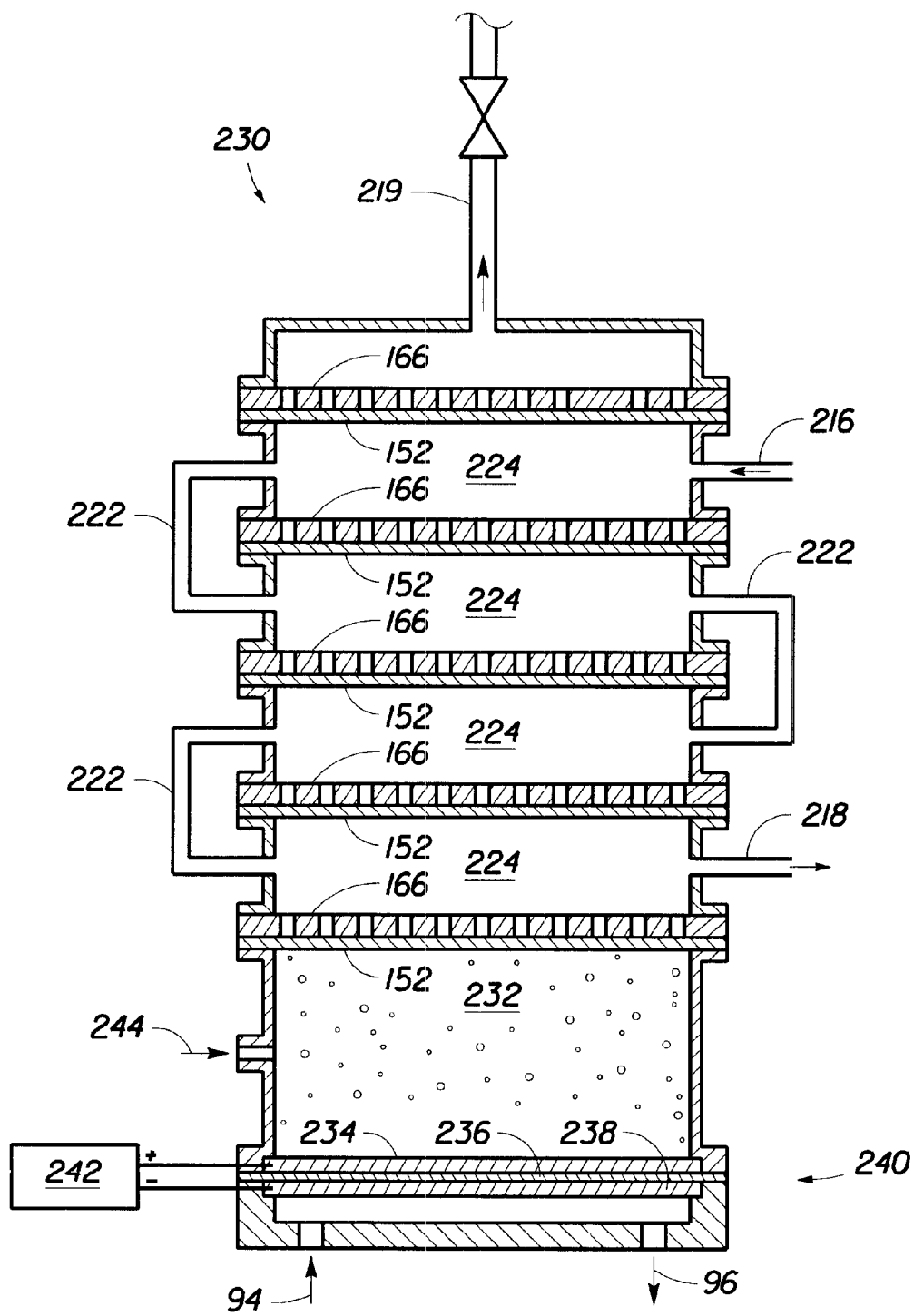
FIG. 11 is an integrated ozone disengagement and re-engagement system 230.

FIG. 11 is an integrated ozone disengagement and re-engagement system 230. The system 230 operates in a similar manner as system 220 of FIG. 10, except that it is in direct fluid communication with an anode reservoir 232, preferably in direct fluid communication with an anode 234 of an electrochemical cell 240. The electrochemical cell 240 is a PEM cell having the anode 234, a proton exchange membrane 236 and a cathode 238, with the anode and cathode being in electronic communication with the positive and negative terminals of a power supply 242. In this and other similar arrangements, water is freely provided to the anode and water, ozone and oxygen are free to flow away from the anode into the anode reservoir. This arrangement provides free flow of water assisted by natural forces of thermal gradients and the buoyancy of gas bubbles generated at the anode. A water source is preferably in communication with the anode reservoir 232 through a small diameter tubing to reduce or eliminate the amount of ozone lost through diffusion out of the system.

The ozone in the anode reservoir 232 is allowed to pass through the hydrophobic membrane 152 along the top of the reservoir into the process water within the adjacent chamber 224. However, since the membrane is hydrophobic, the anode water and any nonvolatile contaminants will remain in the reservoir 232. The ozonated process water in the system 230 exits through line 218. It should be recognized that the cell 240 may provide direct fluid communication with any other form of ozone engagement system, including baffles, packing and the like, so long as the anode water is kept separate from the process water.

While the foregoing is directed to the preferred embodiment of the present invention, other and further embodiments of the invention may be devised without departing from the basic scope thereof, and the scope thereof is determined by the claims which follow.

What is claimed is:

1. An ozone generation and delivery system comprising:
   an electrochemical cell having an anode, an anode flowfield, a cathode, a cathode flowfield, and a proton conducting membrane disposed between the anode and cathode;
   a cathode reservoir in fluid communication with the cathode flowfield through a cathode fluid flow loop; and
   a cooling member disposed in thermal communication with the cathode fluid flow loop, wherein the system does not have an anode reservoir.

2. The system of claim 1, wherein the cooling member is in the cathode reservoir.

3. The system of claim 2, wherein the porous hydrophobic membrane of the cathode reservoir allows gas to be separated from water while the water is contained under pressure.

4. The system of claim 1, wherein the cathode reservoir comprises a liquid reservoir, a gas outlet port located at the top of the reservoir and a porous hydrophobic membrane disposed over the gas outlet port.

5. The system of claim 1, further comprising a recycle line providing fluid communication from the cathode fluid flow loop to the anode flowfield.

6. The system of claim 5, wherein the recycle line comprises a pump and an flow restricting orifice.

7. The system of claim 6, wherein the recirculation line comprises a pump.

8. The system of claim 1, further comprising an ozone gas outlet from the anode, and an ozone re-engagement system in fluid communication with the ozone gas outlet.

9. The system of claim 8, wherein process water from the re-engagement system is isolated from reactant water in the electrochemical cell.

10. The system of claim 9, wherein the isolation is provided by a vapor gap or a hydrophobic membrane.

11. The system of claim 10, wherein the re-engagement system contains a plurality of baffles.

12. The system of claim 1, wherein there is no direct supply of water to the anode.

13. The system of claim 12, wherein the anode relies upon back diffusion of water through the proton exchange membrane from the cathode.

14. The system of claim 12, wherein the proton exchange membrane is a tubulated membrane having internal passages in fluid communication with the cathode reservoir.

15. An ozone generation and delivery system comprising:
a plurality of electrochemical cells, each cell having an anode, an anode flowfield, a cathode, a cathode flowfield, and a proton conducting membrane disposed between the anode and cathode;
a cathode reservoir in fluid communication with the plurality of cathode flowfields through a cathode fluid flow loop; and
a cooling member disposed in thermal communication with the cathode fluid flow loop, wherein the system does not have an anode reservoir.

16. The system of claim 15, further comprising a recycle conduit providing fluid communication from the cathode reservoir to the anode flowfield.

17. The system of claim 16, further comprising a pump having an inlet in fluid communication with the cathode reservoir and an outlet in fluid communication with the cathode flowfield and the anode flowfield, wherein the fluid communication to the anode flowfield is restricted.

* * * * *